Patented Apr. 14, 1942

2,279,294

UNITED STATES PATENT OFFICE 2,279,294

POLYALKYLENE POLYAMINES

Albert F. Hardman, Akron, Ohio, assignor to Wingfoot Corporation, Wilmington, Del., a corporation of Delaware No Drawing. Application April 24, 1940,
Serial No. 331,383

1 Claims. (Cl. 260—563)

This invention relates to polyalkylene polyamines and the preparation thereof. More particularly, it relates to the preparation of N-substituted polyalkylene polyamines by the use of reactants and conditions whereby excellent yields of product, based on the starting materials, are obtained.

When a primary amine is reacted with an alkylene dihalide, such as ethylene dibromide or ethylene dichloride, several reactions take place. For example, it is known that ethylene diamines and piperazines may be produced according to the following equations:

(1) $2R-NH_2 + Br-C_2H_4-Br \longrightarrow R-NH-C_2H_4-NH-R + 2HBr$ (2) $2R-NH_2 + 2Br-C_2H_4Br \longrightarrow R-N\begin{matrix}C_2H_4\\ \\C_2H_4\end{matrix}N-R + 4HBr$ In each of Equations 1 and 2, $R-NH_2$ represents a primary amine. These two reactions proceed simultaneously and both types of products are obtained. In addition, a number of more complex reactions also take place and it is found, in carrying out the reaction, that a mixture of the products of these more complex reactions is also obtained. Experiments have indicated that these more complex products are predominately long chain compounds although there may also be some formation of cyclic compounds by joinder of terminal radicals and other types of reaction may also occur. The long chain compounds may be designated polyalkylene polyamines and may be represented by the structural formula

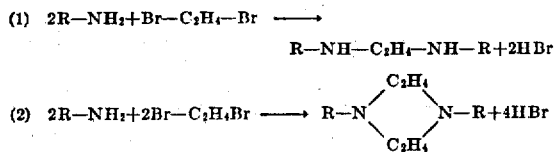

in which $R$, $R_1$ and $R_2$ are aliphatic or aromatic groups, $R_3$ and $R_4$ are alkylene groups and $n$ is a small whole number, usually from one to ten.

According to the present invention, such polyalkylene polyamines are prepared by reacting a primary amine with an alkylene diamine and an alkylene dihalide, the reaction being carried out under such conditions of temperature and pressure that hydrogen halide is split out.

The following example illustrates the preparation of polyalkylene polyamines by the reaction of a primary amine and an alkylene dihalide.

Example 1

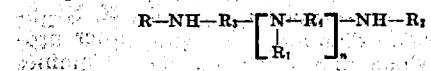

Four hundred fifty-four grams (4 mols) of o-methyl cyclohexylamine were placed in a flask equipped with a stirrer, a reflux condenser and a dropping funnel and heated to about 125° C. Ethylene dibromide was then slowly added through the dropping funnel. To prevent crystallization of amine hydrobromide formed during the reaction, a few cc. of water were added through the condenser from time to time. When about half of the ethylene dibromide used in the reaction (the total being 564 grams or 3 mols) had been added, the mixture was heated to 120–130° C. for 10 minutes and about 90 grams (2.25 mols) of sodium hydroxide dissolved in 167 cc. of water were slowly added. The remainder of the ethylene dibromide was added as before and, after heating 10–15 minutes at 115–120° C., about 180 grams (4.5 mols) of sodium hydroxide dissolved in 334 cc. of water were slowly added. The mixture was then maintained at 115–120° C. for one hour. The oily layer was separated from the aqueous layer and distilled at 6–7 mm. pressure, yielding the following fractions:

| | Grams |
|---|---|
| 1. Below 160° C | 80 |
| 2. 160–205° C | 257 |
| 3. Residue | 205 |

The residue was a brown oil, which became viscous on cooling and consisted principally of high-boiling polyalkylene polyamines. Fraction 2 consisted largely of N, N' di(o-methyl cyclohexyl) ethylene diamine, containing a small amount of N, N'-di-(o-methyl cyclohexyl) piperazine, and amounted to approximately 1 mol of the former. The formation of this by-product by the reaction represented by Equation 1 consumed about 1 mol, or one-third, of the starting ethylene dibromide and about 2 mols, or one-half, of the starting primary amine.

By the practice of the present invention, this production of unwanted by-product is greatly reduced or substantially eliminated. The following examples illustrate the practice of the invention.

Example 2

Three hundred seventy-five grams (1.5 mols) of N, N' di(o-methyl cyclohexyl) ethylene diamine, obtained as in Example 1 or by any other method, 339 grams (3 mols) of o-methyl cyclohexylamine and 564 grams (3 mols) of ethylene dibromide were reacted, using a solution of 270 grams (6.75 mols) of sodium hydroxide dissolved in 500 cc. of water to absorb the hydrobromic acid formed. The mixed amines were heated to about 120° C. and one-half of the ethylene dibromide was slowly added, also adding a few cc. of water from time to time to prevent crystallization. The mixture was heated at 125–130° C.

for 10-15 minutes and about ⅓ of the caustic solution was slowly added. The remainder of the ethylene dibromide was then slowly added followed by the remainder of the caustic solution. The mixture was heated, with stirring, for one hour at 115-120° C. The oily layer was washed with water and distilled at 5-6 mm. pressure, yielding the following fractions:

|   | Grams |
|---|---|
| 1. Below 160° C | 24 |
| 2. 160-205° C | 378 |
| 3. Residue | 262 |

The residue was principally composed of the desired polyalkylene polyamines. As in Example 1, fraction 2 consisted largely of N, N'-di(o-methyl cyclohexyl) ethylene diamine. However, it will be noted that 375 grams of the 378 grams in the product were present at the start of the reaction, i. e., the net production of the by-product was only about 3 grams.

Example 3

A mixture of 200 grams (0.8 mol) of N, N'-di(o-methyl cyclohexyl) ethylene diamine, 135 grams (1.2 mols) of o-methyl cyclohexylamine, 99 grams (1 mol) of ethylene dichloride and 200 cc. of water was placed in a steel autoclave and heated at 200° C. for one-half hour. The reaction mixture was cooled to 100° C., at which temperature it was completely liquid, and was treated with a mixture of 90 grams (2.25 mols) of sodium hydroxide and 100 cc. of water and boiled for one-half hour. The oily portion was then separated, washed with water and distilled at 5 mm. pressure, yielding the following fractions:

|   | Grams |
|---|---|
| 1. Below 160° C | 56 |
| 2. 160-210° C | 221 |
| 3. Residue | 65 |

The residue was the desired product and fraction 2 was principally N, N'-di(o-methyl cyclohexyl) ethylene diamine, the net production of the latter being approximately 21 grams.

Example 4

Two hundred fifty grams (1 mol) of N, N'-di(o-methyl cyclohexyl) ethylene diamine, 113 grams (1 mol) of o-methyl cyclohexylamine, 99 grams (1 mol) of ethylene dichloride, 66 grams (1.2 mols) of calcium oxide and 200 cc. of water were placed in an autoclave and heated for half an hour at a temperature of about 200° C. The mass was then allowed to cool to about 100° C. and was removed from the autoclave and filtered, while still hot, to remove sludge and excess lime. The oily portion of the filtrate was separated from the aqueous portion containing the $CaCl_2$ formed, was washed with a small amount of hot water and was then distilled at 5 mm. pressure, yielding the following fractions:

|   | Grams |
|---|---|
| 1. Below 160° C | 25 |
| 2. 160-215° C | 270 |
| 3. Residue | 64 |

The residue was the desired product and consisted primarily of polyalkylene polyamines. Fraction 2, which was principally N, N'-di(o-methyl cyclohexyl) ethylene diamine, contained a small amount of N, N'-di(o-methyl cyclohexyl) piperazine which crystallized on cooling and was readily removed by filtration. In this example, the net production of N, N'-di(o-methyl cyclohexyl) ethylene diamine was approximately 20 grams.

In each of the foregoing examples, the recovered N, N'-di(o-methyl cyclohexyl) ethylene diamine may be in part unreacted material originally added and may be in part produced by reaction of the o-methyl cyclohexylamine and the ethylene dihalide according to Equation 1. Whatever the mechanism involved, the net effect is that the amount of N, N'-di(o-methyl cyclohexyl) ethylene diamine passes through the reaction without substantial change while the o-methyl cyclohexylamine and ethylene dihalide are substantially completely converted into the desired high-boiling poly alkylene polyamines. The recovered N, N'-di(o-methyl cyclohexyl) ethylene diamine can be added to the succeeding batch as a starting material and, thus, substantially complete utilization of the reactants is obtained in practice by means of the invention.

In each of the foregoing illustrative examples, o-methyl cyclohexylamine and the corresponding ethylene diamine, i. e., N, N'-di(o-methyl cyclohexyl) ethylene diamine, were employed. However, in the practice of the invention, the o-methyl cyclohexylamine may be replaced by any other primary amine, which may be either aromatic or aliphatic. The aliphatic amines may be straight or branched chain or cyclic, saturated or unsaturated, or ring substituted aliphatic amines such as aralkyl amines, furfurylamine and tetrahydrofurfurylamine. Exemplary of such amines are n-butylamine, isopropylamine, the amylamines, the octylamines, allylamine, phenylamine, the tolylamines, beta-naphthylamine, anisidine, phenetidine, p-aminophenol, p-aminodiphenyl, ar-tetrahydronaphthylamine, ac-tetrahydronaphthylamine, cyclohexylamine, decahydronaphthylamine, p-methoxy cyclohexylamine, benzylamine, the hexahydroxylidines, o-cyclohexyl cyclohexylamine, 2,4-dimethyl cyclohexylamine, 3,3,5-trimethyl cyclohexylamine, beta-cyclohexyl ethylamine, the aliphatic aminoalcohols, etc. and other amines which may contain various neutral or basic substituents such as hydroxyl, alkoxy, aryloxy, etc. radicals which are inert in the reaction. When such other amines are used, the corresponding N, N'-disubstituted ethylene diamines may be employed in place of the N, N'-di(o-methyl cyclohexyl) ethylene diamine of the examples. Also, if desired, non-corresponding N, N'-disubstituted ethylene diamines may be employed. Thus, n-heptylamine may be used with N, N'-dibenzyl ethylene diamine, cyclohexylamine with N, N'-di-isoamyl ethylene diamine, hexahydro-o-phenetidine with N, N'-diphenyl ethylene diamine, etc. Also, other propylene, butylene and other alkylene diamines may be employed. Likewise propylene, butylene and other alkylene dihalides may be used in place of the ethylene dibromide and ethylene dichloride of the examples. The process works very well when primary aliphatic amines and N, N'-dialiphatic alkylene diamines are employed and the use of these materials constitutes a preferred form of the invention. In accordance with accepted practice, the terms "aliphatic amine" and "N, N'-dialiphatic diamine" designate compounds in which the aliphatic groups are attached to the amino nitrogen atoms through a carbon-to-nitrogen linkage.

Other absorbents for the hydrogen halide produced in the reaction may be used instead of the caustic and lime of the examples. These include slaked lime, sodium carbonate, sodium bicarbonate, calcium carbonate, barium hydroxide, and the like. Some of these form halides which are well-known to assist or accelerate the further splitting out of hydrogen halide. If desired, such dehydrohalogenation catalysts may be added at the outset. Suitable materials are barium chloride, alumina or aluminum chloride, calcium chloride, etc. The alkaline earth oxides and hydroxides constitute a preferred class of absorbents for the hydrogen halide.

The temperature employed to effect reaction and attendant splitting out of hydrogen halide will vary somewhat with the choice of reactants, hydrogen halide absorbents, dehydrohalogenation catalysts and other conditions. The lower limit is established primarily by the necessity for a practical rate of reaction and will generally be at least 90° C. when alkylene dibromides are used and at least 150° C. when alkylene dichlorides are used. The upper limit is established primarily by the necessity for avoiding decomposition of the reactants and desired products, for example, by the splitting out of ammonia and ammonium halide.

As shown in the examples, various proportions of the reactants may be used. However, equimolecular proportions of the primary amine, the N, N'-disubstituted alkylene diamine and the alkylene dihalide work well in practice and this constitutes a preferred form of the invention.

While only certain preferred forms of the invention have been described in detail, it will be apparent to those skilled in the art that various modifications may be made therein without departing from the scope of the invention as defined in the appended claims.

What I claim is:

1. A process which comprises reacting o-methylcyclohexylamine, N, N'-di(o-methylcyclohexyl) ethylene diamine and an ethylene dihalide with attendant splitting out of hydrogen halide.

2. A process for preparing polyalkylene polyamines which comprises reacting, with the elimination of hydrogen halide, a primary amine, an alkylene diamine in which the amino groups are secondary amino and an alkylene dihalide.

3. A process which comprises reacting, with the elimination of hydrogen halide, a primary amine, the corresponding N, N'-di(secondary amino) alkane and an alkylene dihalide.

4. A process which comprises reacting, with the elimination of hydrogen halide, a primary aliphatic amine, an N, N'-dialiphatic alkylene diamine and an alkylene dihalide.

5. A process which comprises reacting, with the elimination of hydrogen halide and in the presence of lime, a primary aliphatic amine, an N, N'-dialiphatic alkylene diamine and an alkylene dihalide.

6. A process which comprises reacting approximately equimolecular proportions of a primary aliphatic amine, an N, N'-dialiphatic alkylene diamine and an alkylene dihalide, with attendant splitting out of hydrogen halide.

7. A process which comprises reacting approximately equimolecular proportions of a primary aliphatic amine, an N, N'-dialiphatic alkylene diamine and an alkylene dihalide, with attendant splitting out of hydrogen halide, separating from the composite reaction mass the polyalkylene polyamines and the N, N'-dialiphatic alkylene diamine and reacting the recovered N, N'-dialiphatic alkylene diamine with fresh primary aliphatic amine and alkylene dihalide.

8. A process which comprises reacting a primary aliphatic amine, the corresponding N, N'-dialiphatic ethylene diamine and ethylene dichloride with the elimination of hydrogen chloride.

9. A process which comprises reacting, with the elimination of hydrogen halide, a primary alkyl amine, an N, N'-dialkyl ethylene diamine and an ethylene dihalide.

10. A process which comprises reacting, with the elimination of hydrogen halide, a primary alicyclic amine, an N, N'-dialicyclic ethylene diamine and an ethylene dihalide.

11. A process which comprises reacting, with the elimination of hydrogen halide, a primary aryl amine, an N, N'-diaryl ethylene diamine and an ethylene dihalide.

ALBERT F. HARDMAN.